US008160252B2

(12) United States Patent
Lee et al.

(10) Patent No.: US 8,160,252 B2
(45) Date of Patent: Apr. 17, 2012

(54) METHOD AND SYSTEM FOR PROTECTING BROADCAST SERVICE/CONTENT IN A MOBILE BROADCAST SYSTEM, AND METHOD FOR GENERATING SHORT TERM KEY MESSAGE THEREFOR

(75) Inventors: Byung-Rae Lee, Seoul (KR); Sung-Oh Hwang, Yongin-si (KR); Kook-Heui Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1382 days.

(21) Appl. No.: 11/711,499

(22) Filed: Feb. 27, 2007

(65) Prior Publication Data

US 2007/0259647 A1 Nov. 8, 2007

(30) Foreign Application Priority Data

| Feb. 27, 2006 | (KR) | 10-2006-0018849 |
| Mar. 24, 2006 | (KR) | 10-2006-0027184 |
| May 29, 2006 | (KR) | 10-2006-0048168 |
| Jul. 6, 2006 | (KR) | 10-2006-0063652 |

(51) Int. Cl.
   *H04K 1/00* (2006.01)
(52) U.S. Cl. ........ 380/270; 380/247; 380/255; 380/273; 380/281; 455/412.2; 455/437; 713/163
(58) Field of Classification Search .................. 380/247, 380/255, 270, 273, 281; 713/163; 455/412.2, 455/437
See application file for complete search history.

(56) References Cited

U.S. PATENT DOCUMENTS

| 7,643,817 | B2* | 1/2010 | Klug et al. ................... 455/411 |
| 2002/0143710 | A1* | 10/2002 | Liu ................................ 705/75 |
| 2004/0202329 | A1* | 10/2004 | Jung et al. ...................... 380/273 |
| 2005/0079821 | A1* | 4/2005 | Bi ................................. 455/63.1 |
| 2005/0250499 | A1* | 11/2005 | Lee et al. ....................... 455/437 |
| 2005/0289347 | A1* | 12/2005 | Ovadia ........................... 713/171 |
| 2006/0030312 | A1* | 2/2006 | Han et al. ................... 455/432.1 |
| 2006/0115084 | A1* | 6/2006 | Ryu ............................... 380/247 |

(Continued)

FOREIGN PATENT DOCUMENTS

EP 1 575 210 9/2005

(Continued)

OTHER PUBLICATIONS

Suomalainen, Jani, "Content Protection and Authorized Sharing for Mobile Broadcast", Sep. 5, 2005, Helsinki Univeristy of Technology.*

(Continued)

*Primary Examiner* — Jeffrey D Popham
*Assistant Examiner* — Gary Gracia
(74) *Attorney, Agent, or Firm* — The Farrell Law Firm, P.C.

(57) ABSTRACT

Disclosed is a method for generating a Short Term Key Message (STKM) for protection of a broadcast service being broadcasted to a terminal in a mobile broadcast system. The method includes transmitting, by a Broadcast Service Subscription Management (BSM) for managing subscription information, at least one key information for authentication of the broadcast service to a Broadcast Service Distribution/Adaptation (BSD/A) for transmitting the broadcast service, generating, by the BSD/A, a Traffic Encryption Key (TEK) for deciphering of the broadcast service in the terminal and inserting the TEK into a partially created STKM, and performing, by the BSD/A, Message Authentication Code (MAC) processing on the TEK-inserted STKM using the at least one key information, thereby generating a completed STKM.

14 Claims, 11 Drawing Sheets

U.S. PATENT DOCUMENTS

| | | | |
|---|---|---|---|
| 2006/0149965 A1* | 7/2006 | Sharma | 713/163 |
| 2006/0168446 A1* | 7/2006 | Ahonen et al. | 713/163 |
| 2006/0189300 A1* | 8/2006 | Hwang et al. | 455/412.2 |
| 2006/0206708 A1* | 9/2006 | Son et al. | 713/163 |
| 2006/0209843 A1* | 9/2006 | Zhang et al. | 370/395.32 |
| 2007/0061568 A1 | 3/2007 | Lee et al. | |
| 2007/0061569 A1 | 3/2007 | Lee et al. | |
| 2007/0093202 A1 | 4/2007 | Hwang et al. | |
| 2007/0102140 A1 | 5/2007 | Tuma et al. | |
| 2007/0189535 A1* | 8/2007 | Lee et al. | 380/255 |
| 2007/0204305 A1 | 8/2007 | Jung et al. | |
| 2007/0274526 A1 | 11/2007 | Wang et al. | |

FOREIGN PATENT DOCUMENTS

| | | |
|---|---|---|
| JP | 2007-082191 | 3/2007 |
| JP | 2008-508831 | 3/2008 |
| JP | 2008-524914 | 7/2008 |
| JP | 2009-508431 | 2/2009 |
| JP | 2009-512329 | 3/2009 |
| JP | 2009-515362 | 4/2009 |
| JP | 2009-525668 | 7/2009 |
| JP | 2009-532922 | 9/2009 |
| KR | 10-2005-0100124 | 10/2005 |
| WO | WO 2005/057321 | 6/2005 |
| WO | WO 2006/014076 | 2/2006 |
| WO | WO 2006019236 A1 * | 2/2006 |

OTHER PUBLICATIONS

Holtmanns, Silke, "Trust and Security in Mobile Broadcast Systems", May 17, 2006-May 18, 2006, Nokia Research Center Helsinki, Finland.*

Open Mobile Alliance, "Draft Version 1.0, Service and Content Protection for Mobile Broadcast Service", Feb. 24, 2006.*

Open Mobile Alliance, "Draft Version 1.0, Mobile Broadcast Services Architecture", Mar. 28, 2006.*

Bruce Schneier, Applied Cryptography, $2^{nd}$ Ed., John Wiley & Sons, 1996, Chapter 18: One-Way Hash Functions.

Bruce Schneier, Applied Cryptography, $2^{nd}$ Ed., John Wiley & Sons, 1996, Chapter 20: Public-Key Digital Signature Algorithms.

* cited by examiner

METHOD AND SYSTEM FOR PROTECTING BROADCAST SERVICE/CONTENT IN A MOBILE BROADCAST SYSTEM, AND METHOD FOR GENERATING SHORT TERM KEY MESSAGE THEREFOR

PRIORITY

This application claims the benefit under 35 U.S.C. §119(a) of Korean Patent applications entitled "Method And System For Protecting Broadcast Service/Content In A Mobile Broadcast System, And Method For Generating Short Term Key Message Therefor" filed in the Korean Intellectual Property Office on Feb. 27, 2006 and assigned Serial No. 2006-18849, on May 29, 2006 and assigned Serial No. 2006-48168, on Jul. 6, 2006 and assigned Serial No. 2006-63652, and on Mar. 24, 2006 and assigned Serial No. 2006-27184, the contents of each of which are incorporated herein by reference.

BACKGROUND OF THE INVENTION

1. Field of the Invention

The present invention relates generally to a broadcast service method in a mobile broadcast system and a system thereof, and in particular, to a method and system for protecting broadcast service/content between network entities constituting a broadcast system and a method for generating encryption keys and messages using the same.

2. Description of the Related Art

The mobile communication market constantly incurs the need for new services by combining or integrating the existing technologies. Today, the conventional mobile communication system has been developed to provide broadcast services through portable terminals (or mobile terminals) such as a mobile phone and Personal Digital Assistant (PDA). Convergence of mobile communication service and Internet Protocol (IP) technology is now the mainstream of the next generation mobile communication technology due to market needs, the increasing user demand for multimedia services, the strategy of the service providers for providing new services such as broadcast service in addition to the existing voice service, and the interests of Information Technology (IT) companies that are reinforcing their mobile communication business to meet the user demands.

Open Mobile Alliance (OMA), which is a group for studying the standard for interworking between individual mobile solutions, establishes various application standards for features such as mobile games and Internet service. In particular, OMA Browser And Content (BAC) Mobile Broadcast (BCAST) Sub Working Group, one of the OMA working groups, is studying the technology for providing broadcast services using mobile terminals. A brief description will now be made of a mobile broadcast system being discussed in OMA BCAST Working Group.

FIG. 1 is a block diagram illustrating network architecture of a conventional mobile broadcast system.

Referring to FIG. 1, a Content Creation (CC) 10 is a broadcast service (hereinafter BCAST service) provider, and the BCAST service can include the conventional audio/video broadcast service and file (music or data file) download service. A BCAST Service Application (BSA) 20 generates BCAST service data by processing BCAST service data provided from the CC 10 into the form suitable for the BCAST network of FIG. 1, and also generates standardized metadata necessary for a mobile broadcast guide.

A BCAST Service Distribution/Adaptation (BSD/A) 30 sets up a bearer over which it will transmit the BCAST service data provided from the BSA 20, determines transmission schedules of the BCAST services, and generates a mobile broadcast guide. A BCAST Subscription Management (BSM) 40 manages subscription information and BCAST service provisioning information for receipt of the BCAST service, and device information for a mobile terminal receiving the BCAST service.

A Terminal 50 is capable of receiving the BCAST service, and has a function capable of connecting with a cellular network according to terminal capability. Herein, the Terminal 50 is assumed to be connectable with the cellular network. A Broadcast Network 60 is for transmitting the BCAST service, and can be for Digital Video Broadcasting-Handheld (DVB-H), 3GPP Multimedia Broadcast and Multicast Services (MBMS) and 3GPP2 Broadcast and Multicast Services (BCMCS), for example. An Interaction Network 70 is for transmitting the BCAST service on a point-to-point basis, or interactively exchanging control information and additional information related to the receipt of the BCAST service, and can be, for example, the existing cellular network.

In BCAST service, a plurality of mobile terminals receive encrypted service data transmitted by a server for managing broadcast services. The mobile terminals can use the corresponding service by deciphering the encrypted service data provided from the server using an encryption key previous stored therein. In this context, a method for encrypting broadcast content/service is roughly divided into service protection and content protection. Service protection indicates protection of a transmission channel between the BCAST Service Distribution/Adaptation (BSD/A) 30 and the Terminal 50, and content protection indicates end-to-end protection between the BSA 20 and the Terminal 50.

However, in the current mobile broadcast system, there is no detailed proposed scheme such as a method and procedure for generating and transmitting encryption keys and messages for encryption of broadcast service and/or content between the entities constituting a broadcast system, for the safe transmission of broadcast service and/or content. Therefore, a need exists for introduction of such a scheme.

SUMMARY OF THE INVENTION

An aspect of the present invention is to address at least the problems and/or disadvantages and to provide at least the advantages described below. Accordingly, an aspect of the present invention is to provide a method for protecting broadcast service and/or content in a mobile broadcast system, and a system thereof.

Another aspect of the present invention is to provide a method for generating encryption keys and messages for protecting broadcast service and/or content in a mobile broadcast system, and a system thereof.

A further aspect of the present invention is to provide a method for generating a Traffic Encryption Key (TEK) for protecting broadcast service and/or content, and a Short Term Key Message (STKM) in a mobile broadcast system, and a system thereof.

An additional aspect of the present invention is to provide a method for generating and transmitting encryption keys and messages between the entities constituting a broadcast system to protect broadcast service and/or content in a mobile broadcast system, and a system thereof.

Still another aspect of the present invention is to provide a method for configuring a broadcast system, and generating and transmitting messages between components thereof to protect broadcast service and/or content in a mobile broadcast system, and a system thereof.

According to the present invention, there is provided a method for generating an STKM for protection of a broadcast service being broadcasted to a terminal in a mobile broadcast system. The method includes transmitting, by a BSD/A for transmitting the broadcast service to the terminal, a partially created STKM before Message Authentication Code (MAC) processing, to a BSM for managing subscription information, inserting, by the BSM, a TEK for deciphering of the broadcast service into the partially created STKM, and performing, by the BSM, MAC processing on the TEK-inserted STKM, thereby generating a completed STKM.

According to the present invention, there is provided a method for generating an STKM for protection of a broadcast service being broadcasted to a terminal in a mobile broadcast system. The method includes transmitting, by a BSM for managing subscription information, at least one key information for authentication of the broadcast service to a BSD/A for transmitting the broadcast service, generating, by the BSD/A, a TEK for deciphering the broadcast service in the terminal and inserting the TEK into a partially created STKM, and performing, by the BSD/A, MAC processing on the TEK-inserted STKM using the at least one key information, thereby generating a completed STKM.

According to the present invention, there is provided a mobile broadcast system for transmitting an STKM for reception of a broadcast service to a terminal. The system includes a BSD/A for generating a partially created STKM before MAC processing, encrypting the broadcast service using a TEK, and broadcasting the encrypted broadcast service; and a BSM for managing subscription information of the terminal, inserting the TEK into the partially created STKM received from the BSD/A, generating a completed STKM by performing MAC processing on the TEK-inserted STKM, and transmitting the completed STKM to the BSD/A.

According to the present invention, there is provided a mobile broadcast system for transmitting a STKM for reception of a broadcast service to a terminal. The system includes a BSD/A for inserting a TEK of the broadcast service into a partially created STKM before MAC processing, and generating a completed STKM using at least one key information including authentication key; and a BSM for managing subscription information of the terminal, and transmitting the at least one key information to the BSD/A.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
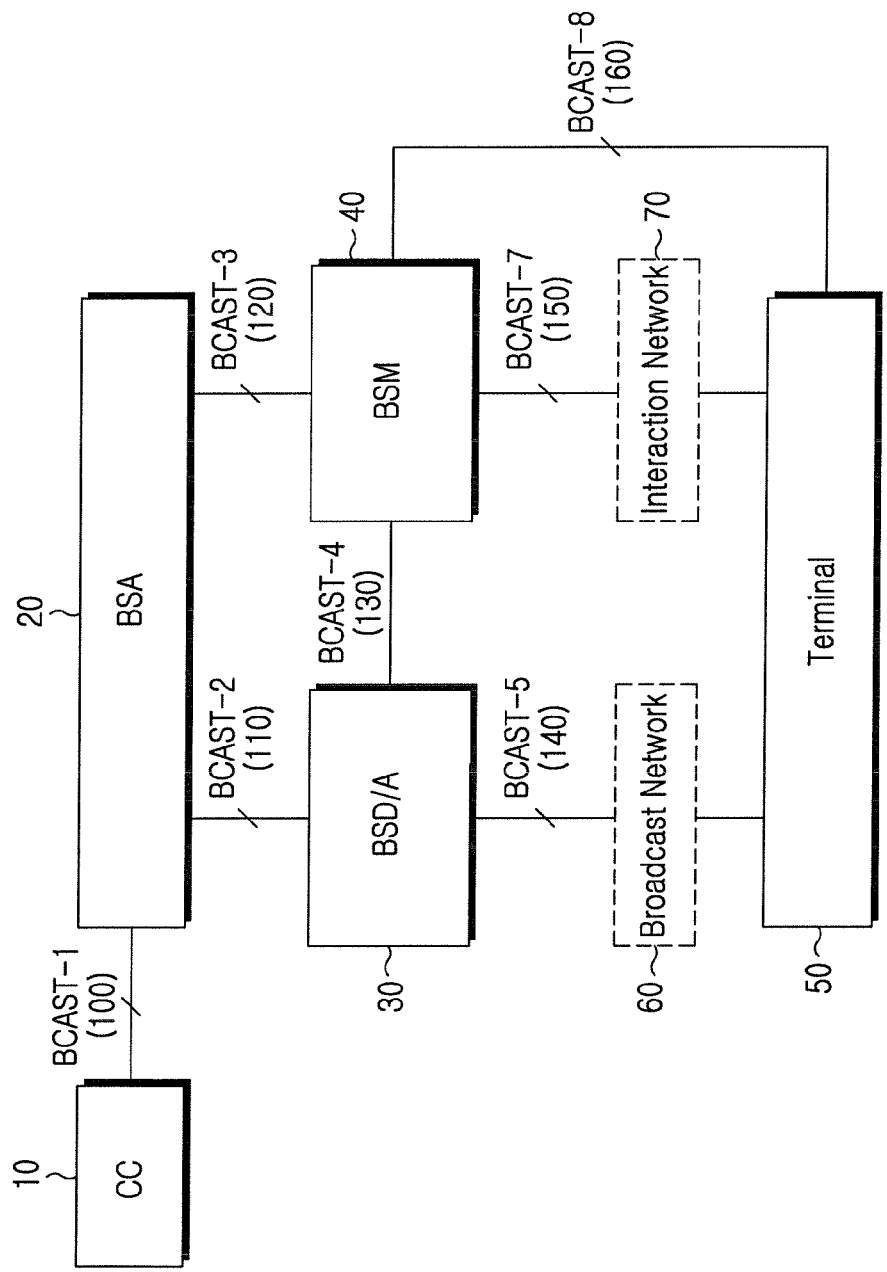
FIG. 1 illustrates network architecture of a conventional mobile broadcast system.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for the sake of clarity and conciseness.

For convenience, a description of the present invention will be made herein using the names of the entities defined in the $3^{rd}$ Generation Partnership Project (3GPP), which is the asynchronous mobile communication standard, or defined in the BCAST of the aforementioned OMA. However, the stated standards and entity names thereof are not intended to limit the scope of the present invention, and the present invention can be applied to any system having similar technical background.

A brief description will first be made of a basic method for performing service protection and content protection in a mobile broadcast system according to the present invention. The basic architecture of the mobile broadcast system, to which the present invention is applicable, is shown in FIG. 1, and the present invention will disclose service and content protection schemes therefor.

The content provided from a CC 10 for content protection is encrypted in a BSA 20 or a BSD/A 30, and then broadcasted to a Terminal 50. Unlike content protection, the BSD/A 30 for service protection performs encryption on a transmission channel over which the BCAST service is provided. A BSM 40 performs subscription management of a Terminal 50 for service protection and/or content protection.

Information related to encryption keys used for service protection and/or content protection and a method of using the same are as follows. In order to use the broadcast service/content provided from the broadcast system of FIG. 1, the Terminal 50 subscribes to the BSM 40 as a service subscriber, and then receives a Registration Key Material (RKM). Thereafter, the Terminal 50 can acquire a Long-Term Key Message (LKM) upon its subscription to the service, and then acquire a Short-Term Key Message (STKM) used for deciphering the encrypted service/content.

In addition, the Terminal 50 can decipher the LKM using the RKM, and acquires a Service Encryption Key (SEK) and a Service Authentication Key (SAK) as a result of the deciphering. The SEK and SAK are included in the LKM in the merged form called a Service Encryption Authentication Key (SEAK), and then delivered to the Terminal 50.

The STKM includes a TEK, and in order to protect the TEK, the STKM is encrypted by the SEAK and then a MAC function is applied thereto. Using the TEK deciphered by the SEAK, the Terminal 50 can decipher the encrypted service/content.

The service protected through the encryption keys is transmitted from the BSD/A 30 to the Terminal 50 as shown in FIG. 1, and the content protected by the encryption keys is transmitted from the BSA 20 to the Terminal 50.

Table 1 provides a definition of BCAST interfaces (BCAST-1 to BCAST-8) 100 to 160 shown in FIG. 1.

TABLE 1

| Interfaces | Function |
| --- | --- |
| BCAST-1 | Content is delivered from CC to BSA. |
| BCAST-2 | Content/Service are delivered from BSA to BSD/A. |
| BCAST-3 | TEK for encrypting Content is delivered from BSM to BSA. |
| BCAST-4 | TEK, RKM, LKM, STKM, etc. are delivered from BSM to BSD/A. SG Data Request Message and its Response Message are exchanged between BSD/A and BSM. |
| BCAST-5 | Encrypted Service and Encrypted RKM, LKM, etc. are delivered to Terminal |
| BCAST-7 | RKM, LKM are transmitted from BSM to Terminal over Interaction Channel. |
| BCAST-8 | Out-of-Band Channel between Terminal and BSM |

In Table 2 to Table 7, 'Name' indicates names of elements and attributes constituting the corresponding message. 'Type' indicates a type (Element or Attribute) of the corresponding name. The elements have values E1, E2, E3 and E4, wherein E1 indicates an upper element for the entire message, E2 indicates a sub-element of E1, E3 indicates a sub-element of E2, and E4 indicates a sub-element of E3. An attribute is denoted by A, and A indicates an attribute of the corresponding element. For example, A under E1 indicates an attribute of E1. 'Category' is used for determining whether the corresponding element or attribute is mandatory or optional, and has an M value for the mandatory element or attribute, and an O value for the optional element or attribute. 'Cardinality' indicates a relationship between elements, and has values 0, 0 . . . 1, 1, 0 . . . n, 1 . . . n. Herein, 0 indicates an optional relationship, 1 indicates a mandatory relationship, and n indicates that a plurality of values can be used. For example, 0 . . . n indicates that the corresponding message may have no element, or n elements. 'Description' indicates meaning of the corresponding element or attribute, and 'Data Type' indicates a data type for the corresponding element or attribute.

Table 2 to Table 7 show field formats of the messages defined in the present invention, and a description of each field of the messages is given in the corresponding table. In addition, Table 8 shows the possible situations to which the messages can be applied. An encryption key and a message used herein for encryption of service/content will be referred to as a TEK and an STKM, respectively.

Table 2 provides a definition of a Request Message Format Req-1.

TABLE 2

| Name | Type | Category | Cardinality | Description | Data Type |
| --- | --- | --- | --- | --- | --- |
| Tag | E | M | 1 | Type of message | Integer |
| Version | E | O | 1 | Version of Standard Technology Supported by this message | Integer |
| Message ID | E | M | 1 | ID of this Message | String |
| Destination | E | M | 1 | Message Destination ID | String |
| Source | E | M | 1 | Message Source ID | String |
| Service/Content Info. | E | M | 1 | Related Information such as corresponding Service/Content ID | String |
| Option | E | O | 1 | Designation of Single STKM or multiple STKMs | String |
| Time | E | O | 1 | Message transmitted Time | String |

Table 3 provides a definition of a Response Message Format Res-1.

TABLE 3

| Name | Type | Category | Cardinality | Description | Data Type |
| --- | --- | --- | --- | --- | --- |
| Tag | E | M | 1 | Type of Message | Integer |
| Version | E | O | 1 | Version of Standard Technology Supported by this Message | Integer String |
| Message ID | E | M | 1 | ID of Request Message | String |
| Destionation | E | M | 1 | Message Destination ID | String |
| Source | E | M | 1 | Message Source ID | String |
| Service/Content Info. | E | O | 1 | Related Information such as corresponding Service/Content ID | String |
| Status | E | M | 1 | Response Result of Message | String |
| Data | E | O | 1 | Desired Information to be delivered to Destination | Binary |
| Time | E | O | 1 | Message transmitted Time | String |

Table 4 provides a definition of a Response Message Format Res-2.

TABLE 4

| Name | Type | Category | Cardinality | Description | Data Type |
| --- | --- | --- | --- | --- | --- |
| Tag | E | M | 1 | Type of Message | Integer |
| Message ID | E | M | 1 | ID of Request Message | String |
| Status | E | M | 1 | Response Result of Message | Integer |
| Data | E | O | 1 | Desired Information to be delivered to Destination | Binary |

Table 5 provides a definition of a Delivery Message Format Tra-1.

TABLE 5

| Name | Type | Category | Cardinality | Description | Data Type |
| --- | --- | --- | --- | --- | --- |
| Tag | E | M | 1 | Type of Message | Integer |
| Version | E | O | 1 | Version of Standard Technology Supported by this Message | Integer |
| Message ID | E | M | 1 | ID of this Message | String |
| Destination | E | M | 1 | Message Destination ID | String |
| Source | E | M | 1 | Message Source ID | String |
| Service/ Content Info | E | M | 1 | Related Information such as corresponding Service/Content ID | String |
| Data | E | M | 1 | Desired Information to be delivered to Destination | Binary |
| Option | E | O | 1 | Designation of Single STKM or multiple STKMs | Integer |
| Time | E | O | 1 | Message Transmitted Time | String |

Table 6 provides a definition of a Confirm Message Format Con-1.

TABLE 6

| Name | Type | Category | Cardinality | Description | Data Type |
| --- | --- | --- | --- | --- | --- |
| Tag | E | M | 1 | Type of Message | Integer |
| Version | E | O | 1 | Version of Standard Technology Supported by this Message | Integer |
| Message ID | E | M | 1 | ID of Delivery Message | String |
| Destination | E | M | 1 | Message Destination ID | String |
| Source | E | M | 1 | Message Source ID | String |
| Service/ Content Info. | E | O | 1 | Related Information such as corresponding Service/Content ID | String |
| Status | E | M | 1 | Confirmation Result of Message | Integer |
| Time | E | O | 1 | Message transmitted Time | String |

Table 7 provides a definition of a Confirm Message Format Con-2.

TABLE 7

| Name | Type | Category | Cardinality | Description | Data Type |
| --- | --- | --- | --- | --- | --- |
| Tag | E | M | 1 | Type of Message | Integer |
| Message ID | E | M | 1 | ID of Delivery Message | String |
| Status | E | M | 1 | Confirmation Result of Message | Integer |

Table 8 shows message types identified using 'Tag' defined in the message formats of Table 2 to Table 7. The 'Tag' values defined below are not always fixed, but simply indicate the message types, and they are subject to change according to circumstances. Generally, in the Response Message and the Confirm Message, Status='0' indicates that a corresponding entity has successfully received the request and delivery messages and has performed the associated event, and Status='1' indicates that the corresponding entity has failed in receiving the request and delivery messages and thus has failed in performing the associated event.

In Table 2 to Table 7, an 'Option' field is used for indicating whether a single STKM is requested or multiple STKMs are requested. Herein, Option='0' indicates that a single STKM is requested, and Option='1' indicates that multiple STKMs, i.e. all STKMs for the corresponding content (program), are requested. In addition, Option='2' indicates that all STKMs for one service are requested.

In addition, Table 8 shows message types and applied message types according to 'Tag' value, and the messages can obtain performance improvement with use of the shortened message Res-2 or Con-2 with a message ID, shown in 'Applied Message Type'.

TABLE 8

| Tag | Message Type | Applied Message Type | Delivered Information |
|---|---|---|---|
| 5 | STKM Request Message | Req-1 | STKM |
| 6 | STKM Request Response Message | Res-1 or Res-2 | |
| 7 | STKM Delivery Message | Tra-1 | |
| 8 | STKM Delivery Confirm Message | Con-1 or Con-2 | |
| 17 | SEAK Request Message | Req-1 | SEAK |
| 18 | SEAK Request Response Message | Res-1 or Res-2 | |
| 19 | SEAK Delivery Message | Tra-1 | |
| 20 | SEAK Delivery Confirm Message | Con-1 or Con-2 | |

Figure 2:
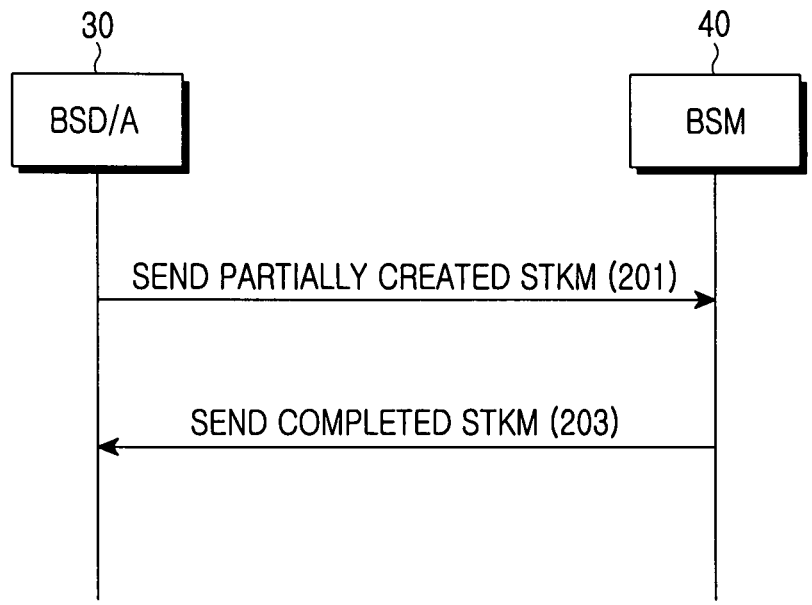
FIG. 2 illustrates a BSM-based method for generating an encryption key and a short term key message according to a first embodiment of the present invention.

FIG. 2 is a signaling diagram illustrating a BSM-based method for generating an encryption key and a short term key message according to a first embodiment of the present invention, wherein a TEK is generated as the encryption key and an STKM is generated as the short term key message. The STKM is a message generated in a BSM 40 so that a subscriber may acquire an LKM through subscription to the service and then acquire a TEK with which it can decipher broadcast service and/or content.

In the TEK and STKM generation method presented in the first embodiment of the present invention, the BSM 40 directly generates the TEK and the STKM, but a BSD/A 30 also partially participates in the STKM generation process. In generating the STKM, the BSD/A 30 does not create a TEK part, and a MAC part of the STKM.

Referring to FIG. 2, in step 201, the BSD/A 30 delivers a partially created STKM, i.e. STKM without TEK and MAC, to the BSM 40. To this end, though not shown in FIG. 2, the BSM 40 can send the Req-1 of Table 2 to the BSD/A 30 as an STKM Request Message. Upon receipt of the STKM Request Message, the BSD/A 30 can send the Res-1 of Table 3 or the Res-2 of Table 4 as a STKM Request Response Message to the BSM 40 that transmitted the partially created STKM.

As another example, the BSD/A 30 can directly send the partially created STKM using the Tra-1 defined in Table 5 as an STKM Delivery Message without a request of the BSM 40. In this case, upon receipt of the STKM Delivery Message, the BSM 40 sends the Con-1 defined in Table 6 or Con-2 defined in Table 7 as an STKM Delivery Confirm Message indicating receipt of the STKM, to the BSD/A 30 in response thereto.

In step 203, the BSM 40 generates a TEK after receiving the partially created STKM. In addition, the BSM 40 encrypts the generated TEK with an SEK and inserts it into the STKM, and also performs MAC function processing on the STKM using an SAK and generates a completed STKM by inserting the processing result value into the STKM. The completed STKM is sent from the BSM 40 to the BSD/A 30.

Figure 3:
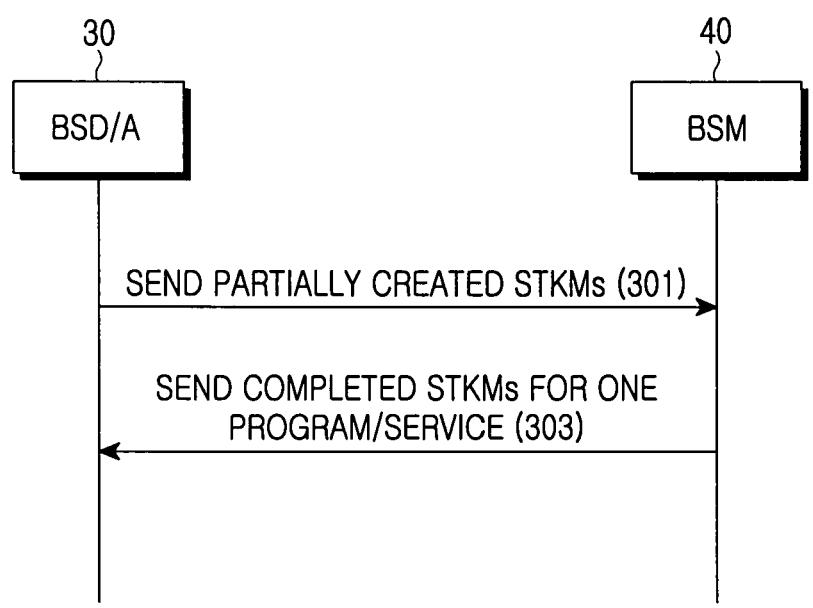
FIG. 3 illustrates a BSM-based method for generating a plurality of encryption keys and short term key messages according to a second embodiment of the present invention.

FIG. 3 illustrates a BSM-based method for generating a plurality of encryption keys and short term key messages according to a second embodiment of the present invention, wherein a plurality of TEKs and STKMs are generated for one content (program)/service.

Referring to FIG. 3, in step 301, a BSD/A 30 sends a plurality of partially created STKMs for one content (program) or one service to a BSM 40. In step 303, the BSM 40 delivers a plurality of STKMs completed for one content (program) or one service to the BSD/A 30. Therefore, in the method of FIG. 3, although it is similar to the method disclosed in FIG. 2, the BSM 40 sends a plurality of STKMs generated for one content (program) or one service, instead of sending one completed STKM. In this case, in the Req-1 defined in Table 2 as an STKM Request Message, a value of an Option field should be '1' or '2' indicating transmission of a plurality of STKMs. In addition, as described in another example of FIG. 2, even when the BSD/A 30 directly sends the partially created STKM using the Tra-1 defined in Table 5 as an STKM Delivery Message to the BSM 40, a value of its Option field should be designated as '1' or '2' indicating transmission of a plurality of STKMs.

Although the BSM 40 generates the TEK in the embodiments of FIGS. 2 and 3, the BSD/A 30 rather than the BSM 40 can generate the TEK, insert it into the partially created STKM together with partial information, and deliver it to the BSM 40. In this case, the BSM 40 encrypts the TEK with a SEK, inserts it back into the STKM without a MAC, received from the BSD/A 30, performs MAC function processing thereon with a SAK and resends the completed STKM to the BSD/A 30.

In addition, the BSD/A 30 can send the partially created STKM with a TEK to the BSM 40. In an alternative method, however, if the BSD/A 30 sends information necessary for STKM generation, like the TEK, using several fields of the message, then the BSM 40 can generate an STKM by extracting the associated information including the TEK from the corresponding message.

Figure 4:
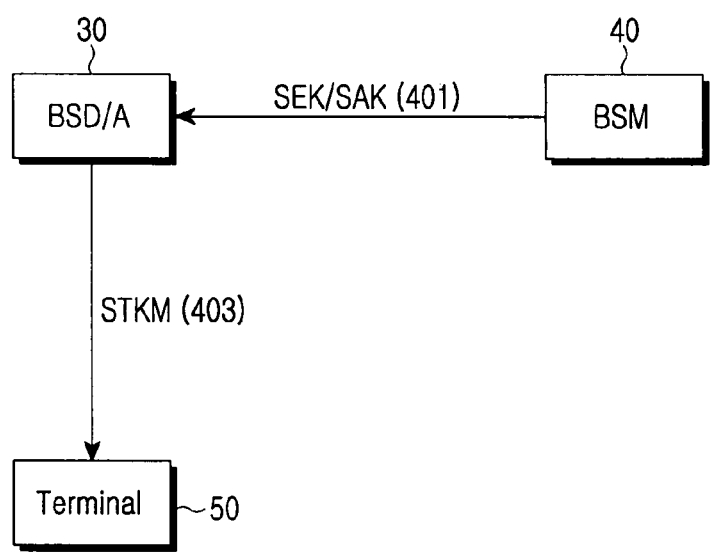
FIG. 4 illustrates a BSD/A-based method for generating an encryption key and a short term key message according to a third embodiment of the present invention.

FIG. 4 illustrates a BSD/A-based method for generating an encryption key and a short term key message according to a third embodiment of the present invention, wherein a TEK is generated as the encryption key and an STKM is generated as the short term key message.

In FIG. 4, a BSD/A 30 exclusively generates the TEK and the STKM. To this end, in step 401, a BSM 40 delivers an SEK and an SAK for service encryption and authentication to the BSD/A 30 so that the BSD/A 30 can perform MAC processing on the STKM. Upon receipt of the SEK and the SAK, the BSD/A 30 encrypts in step 403 the TEK using the SEK, inserts it into the partially created STKM, and performs MAC function processing on the TEK-inserted STKM with a SAK, thereby generating a completed STKM. In addition, the BSD/A 30 transmits the generated STKM to a Terminal 50.

The BSD/A 30, although not shown in FIG. 4, can send the Req-1 defined in Table 2 as an SEAK Request Message for requesting transmission of the SEK and the SAK to the BSM 40. Upon receipt of the SEK and the SAK, the BSM 40 can send the Res-1 defined Table 3 or the Res-2 defined in Table 4 as an SEAK Response Message to the BSD/A 30 in response thereto.

As another example, the BSM 40 can directly transmit the SEK and the SAK by sending the Tra-1 defined in Table 5 as a SEAK Delivery Message to the BSD/A 30 even when there is no transmission request for SEK and SAK from the BSD/A 30. Upon receipt of the SEAK Delivery Message, the BSD/A 30 can send the Con-1 defined in Table 6 or the Con-2 defined in Table 7 as a Delivery Confirm Message to the BSM 40. Although the merged SEAK of the SEK and the SAK can be exchanged between the BSM 40 and the BSD/A 30 in the method disclosed in FIG. 4, the SEK and the SAK can also be transmitted separately.

The message formats of Table 2 to Table 6 disclosed in the present invention can also be defined as message formats shown in Table 9 to Table 12.

Table 9 provides a definition of a Request Message Format Req-1', which is another message format of Table 2.

TABLE 9

| Name | Type | Category | Cardinality | Description | Data Type |
|---|---|---|---|---|---|
| SKeyReq | E | | | Specifies the Key Request message. Contains the following attributes: KeyReqid EntityAddress Tag Version Time Contains the following elements: GlobalServiceID | |
| SKeyReqid | A | M | 1 | Identifier of Key Request Message | unsignedInt (32bits) |
| Entity Address | A | M | 1 | Network Entity Address to receive the response of this message | anyURI |
| Tag | A | O | 0 ... 1 | Identifier for the message type defined in section x.x | unsignedByte |
| Version | A | O | 0 ... 1 | BCAST enabler version supported by this message | String |
| Time | A | O | 0 ... 1 | The time when this message is sent. NTP time format SHALL be used for this field | Integer |
| GlobalServi | E1 | M | 1 ... N | Identifier of the service to be encrypted | anyUR1 |

Table 10 provides a definition of a Response Message Format Res-1', which is another message format of Table 3.

TABLE 10

| Name | Type | Category | Cardinality | Description | Data Type |
|---|---|---|---|---|---|
| SKRRes | E | | | Specifies the Response message of Key Request message. Contains the following attributes: Tag Version Time Contains the following elements: KeyReqid | |
| Tag | A | O | 0 ... 1 | Identifier for the message type defined in section x.x | unsignedByte |
| Version | A | O | 0 ... 1 | BCAST enabler version supported by this message. | String |
| Time | A | O | 0 ... 1 | The time when this message in sent. NTP time format SHALL be used for this field | Interger |
| SKeyReqid | E1 | M | 1 ... N | Identifer of Key Request Message contains the following attributes: StatusCode | unsignedInt(32bits) |
| StatusCode | A | M | 1 | The overall outcome of the request, according to the Global Status Codes defined in Appendix D. | unsignedByte |
| Global ServiceID | E2 | O | 0 ... N | Identifier of the service to be encrypted Contains the following attributes: Data | anyURI |
| Data | A | M | 1 | TEK related to GlobalServiceID | String |

Table 11 provides a definition of a Delivery Message Format Tra-1', which is another message format of Table 5.

TABLE 11

| Name | Type | Category | Cardinality | Description | Data Type |
|---|---|---|---|---|---|
| SKeyDelivery | E | | | Specifies the Key Delivery Message. Contains the following attributes: KeyDelivery EntityAddress Tag Version Time Contains the following elements GlobalServiceID | |
| SKeyDelivery | A | M | 1 | Identifier of Key Request Message | unsignedInt(32bits) |
| EntityAddress | A | M | 1 | Network Entity Address to receive the response of this message. | anyURI |

TABLE 11-continued

| Name | Type | Category | Cardinality | Description | Data Type |
| --- | --- | --- | --- | --- | --- |
| Tag | A | O | 0...1 | Identifier for the message type defined in section x.x | unsignedByte |
| Version | A | O | 0...1 | BCAST enabler version supported by this message. | String |
| Time | A | O | 0...1 | The time when this message is sent. NTP time format SHALL be used for this field | Integer |
| GlobalService ID | E2 | M | 1...N | Identifier of the service to be encrypted Contains the following attributes: Data | any URI |
| Data | A | M | 1 | TEK related to GlobalServiceID | String |

Table 12 provides a definition of a Confirm Message Format Con-1', which is another message format of Table 6.

TABLE 12

| Name | Type | Category | Cardinality | Description | Data Type |
| --- | --- | --- | --- | --- | --- |
| SKDRes | E | | | Specifies the Confirmation message of Key Delivery message. Contains the following attributes: Tag Version Time Contains the following elements: KeyDeliveryid | |
| Tag | A | O | 0...1 | Identifier for the message type defined in section x.x | unsignedByte |
| Version | A | O | 0...1 | BCAST enabler version supported by this message. | String |
| Time | A | O | 0...1 | The time when this message is sent. NTP time format SHALL be used for this field. | Integer |
| SKeyDelivery | E1 | M | 1...N | Identifier of Key Delivery Message. Contains the following attributes: StatusCode | UnsignedInt (32bits) |
| StatusCode | A | M | 1 | The overall outcome of the request, according to the Global Status Codes defined in Appendix D. | unsignedByte |

Figure 5:
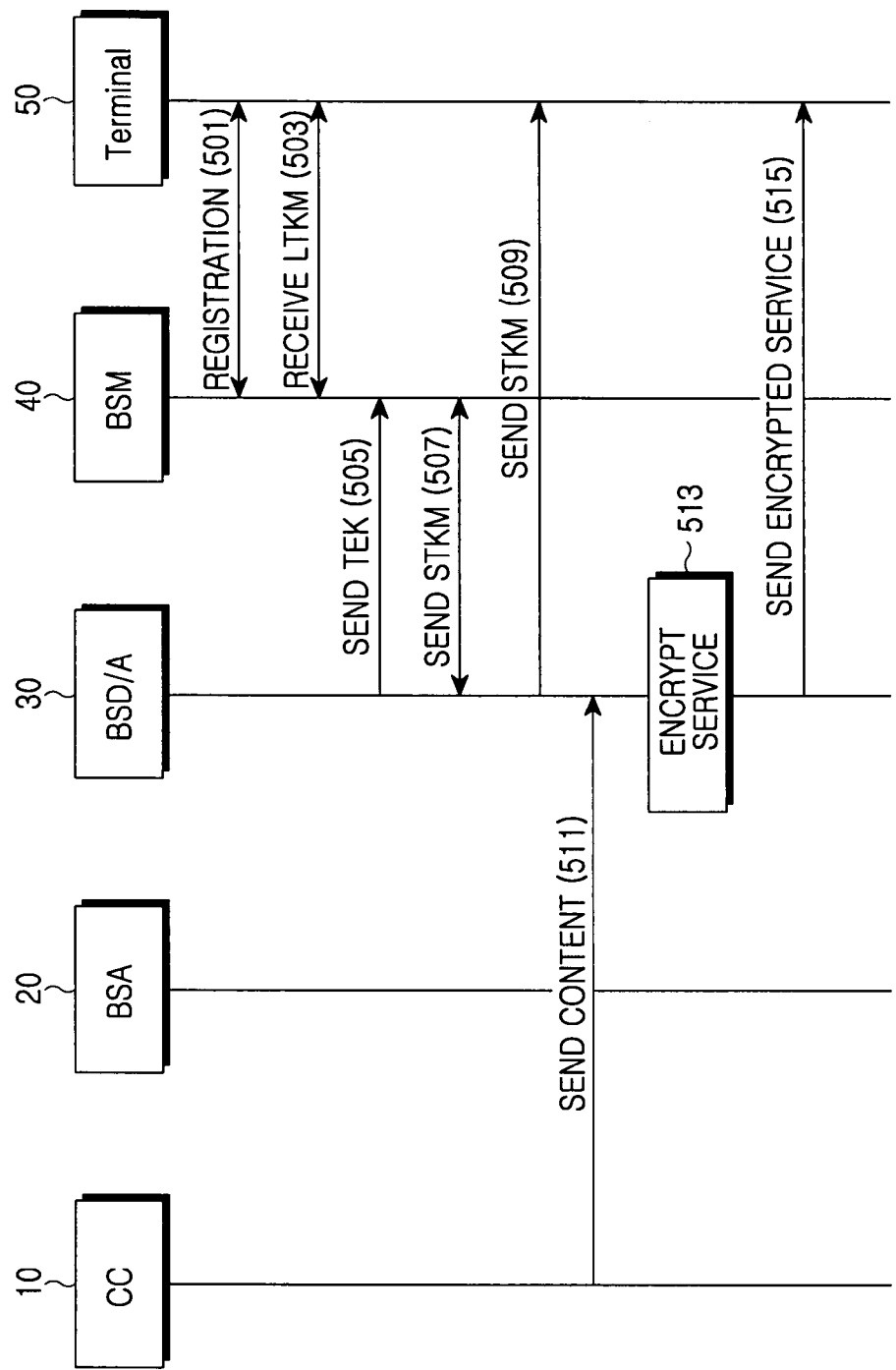
FIG. 5 illustrates a BCAST service protection method using the first or second embodiment of the present invention.
Figure 6:
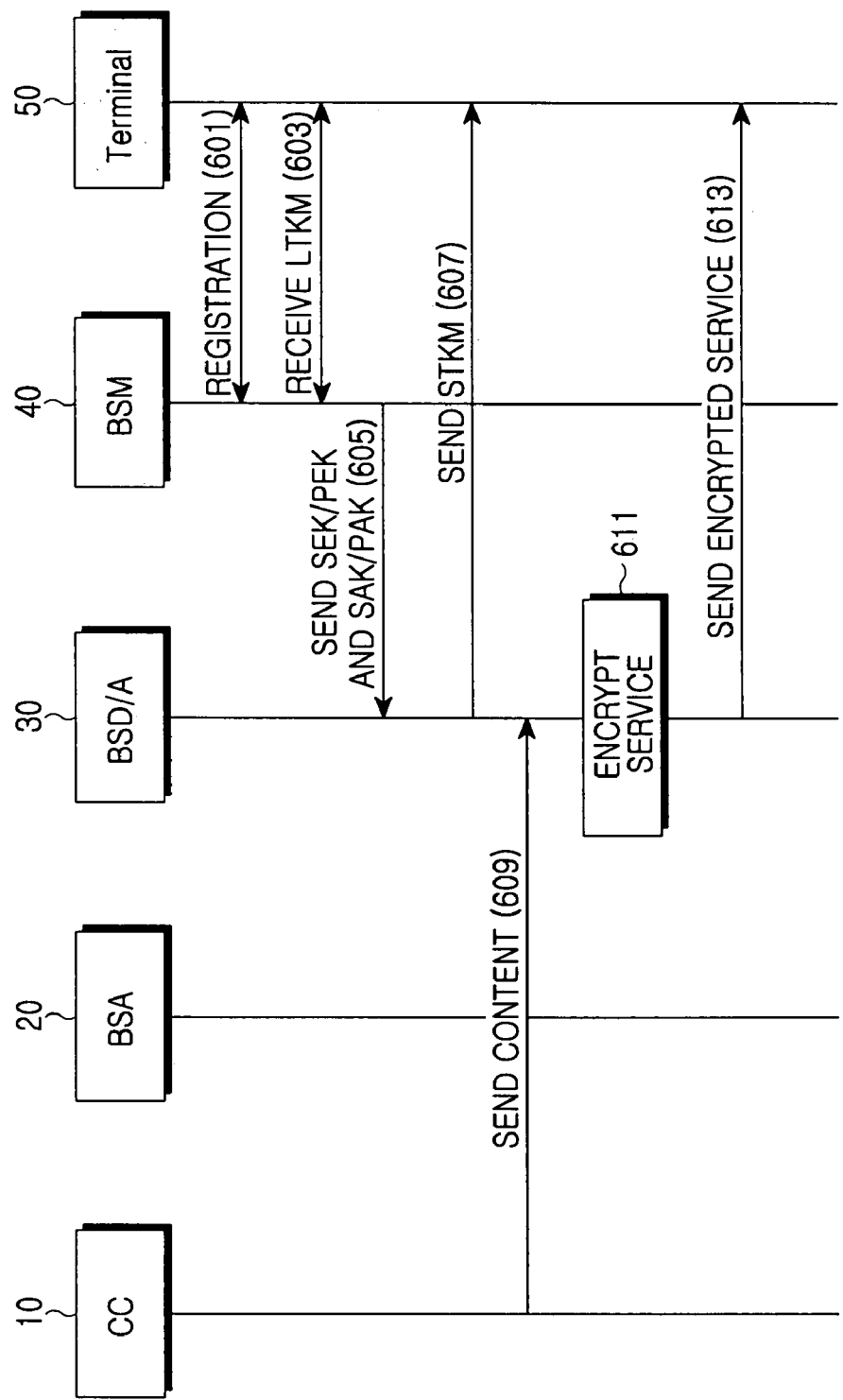
FIG. 6 illustrates a BCAST service protection method using the third embodiment of the present invention.

With reference to FIGS. 5 and 6, a description will now be made of an example in which the disclosed STKM generation methods described in FIGS. 2 to 4 are applied to a BCAST service protection method.

FIG. 5 is a signaling diagram illustrating a BCAST service protection method using the first or the second embodiment of the present invention. This shows a procedure for transmitting an encrypted service using the embodiment of FIG. 2 or FIG. 3, wherein a content encryption process for content protection is optional. Therefore, a description of the content encryption will be omitted herein.

Referring to FIG. 5, in step 501, a Terminal 50 accesses, via an Interaction Network 70, a BSM 40 that manages subscription information and BCAST service provisioning information of a subscriber for receipt of a BCAST service, and performs a registration procedure for BCAST service subscription and reception. After performing the registration procedure, the Terminal 50 acquires in step 503 an LTKM including therein an SEK (or Program Encryption Key (PEK) and an SAK (or Program Authentication Key (PAK), from the BSM 40. The LTKM is used in a process where the Terminal 50 deciphers the encrypted broadcast service. Herein, the SEK/SAK are keys used for encryption/digital signature for a service, and the PEK/PAK are keys used for encryption/digital signature for a program. The service can be considered as a set of contents, and the program can be considered as one content.

In step 505, a BSD/A 30 generates a TEK used when the Terminal 50 deciphers the encrypted service. The BSD/A 30 sends the generated TEK to the BSM 40. When the BSM 40 directly generates the TEK, the TEK generation procedure can be omitted.

In step 507, the BSD/A 30, when it directly generates the TEK, transmits a partially created STKM including the TEK but not including a MAC, to the BSM 40. The partially created STKM includes other information necessary for generation of the STKM. Upon receipt of the partially created STKM, the BSM 40 encrypts the TEK with its SEK/PEK, and generates a completed STKM by performing digital signature processing on the partially created STKM with the TEK using the SAK/PAK. Herein, a public/private key scheme as RSA, or MAC function processing can be used as the digital signature processing. In step 507, the BSD/A 30 and the BSM 40 can exchange an STKM Delivery Message or an STKM Request Message, for an exchange of the partially created STKM. The completed STKM is delivered to the BSD/A 30.

In addition, the BSD/A 30 can transmit the partially created STKM with the TEK to the BSM 40. In an alternative method, however, if the BSD/A 30 sends the information necessary for STKM generation, like the TEK, using several fields of the message, the BSM 40 can generate the STKM using the associated information including the TEK.

In step 509, the BSD/A 30 transmits the completed STKM to the Terminal 50. In step 511, a CC 10 delivers the content being broadcasted to the subscriber, to the BSD/A 30, and upon receipt of the content, the BSD/A 30 encrypts the service being provided to the Terminal 50 using the TEK in step 513, and transmits the encrypted service to the Terminal 50 via a Broadcast Network 60 in step 515.

Thereafter, the Terminal 50 can obtain the TEK used for deciphering the broadcast service by deciphering the STKM acquired in step 509 using the SEK/PEK and the SAK/PAK acquired through the registration and LTKM reception procedures of steps 501 and 503, and can decipher the encrypted service using the TEK, thereby reproducing the service. The foregoing procedure, as described in the embodiment of FIG. 3, can also be applied to a procedure for transmitting a plurality of STKMs for one program/service.

FIG. 6 illustrates a BCAST service protection method using the third embodiment of the present invention. This shows a procedure for transmitting an encrypted service using the embodiment of FIG. 4. In this embodiment, a BSD/A 30 exclusively generates the TEK, and delivers SEK/PEK and SAK/PAK for service encryption and authentication to a BSD/A 30 so that the BSD/A 30 can perform MAC processing on the STKM.

An operation of steps 601 and 603 in which a Terminal 50 accesses a BSM 40, performs a registration procedure for service subscription and reception, and receives an LTKM with SEK/PEK and SAK/PAK is to the same as the operation of steps 501 and 503 of FIG. 5, so a detailed description thereof will be omitted.

In step 605, the BSM 40 delivers its own SEK/PEK and SAK/PAK to the BSD/A 30. In step 607, the BSD/A 30 generates a partially created STKM using its generated TEK and other information, and finally performs digital signature processing thereon with the SAK/PAK, thereby generating a completed STKM. Herein, a public/private key scheme as RSA, or MAC function processing can be used as the digital signature processing. Thereafter, an operation of steps 607 to 613 in which the BSD/A 30 sends the completed STKM to the Terminal 50 and broadcasts the service encrypted with the TEK is to the same as the operation of steps 509 to 515 of FIG. 5.

Therefore, even in the embodiment of FIG. 6, the Terminal 50 can acquire the TEK through the STKM, and decipher the encrypted service using the TEK, thereby reproducing the service. The foregoing procedure, as described in the embodiment of FIG. 3, can also be applied to a procedure for transmitting a plurality of STKMs for one program/service.

With reference to FIGS. 7 to 10, a description will now be made of a message-handling scheme between components constituting the entities in the broadcast architecture based on FIGS. 5 and 6. The description of FIGS. 7 to 10 will be made with reference to an example to which the methods presented in FIGS. 2 and 3 are applied. However, it would be obvious to those skilled in the art that the following description of FIGS. 7 to 10 is not limited to FIGS. 2 and 3, and can also be applied to the method presented in FIG. 4. Although a registration process and an LTKM reception process are performed in a network supporting interaction channels in FIGS. 7 to 10, they can also be applied to a network supporting broadcast channels.

As described above, the broadcast architecture can be divided into broadcast service protection architecture and broadcast content protection architecture, and a difference between them is as follows. The broadcast content protection architecture can support right management for the transmission content. However, the broadcast service protection architecture has no right management function.

Figure 7:
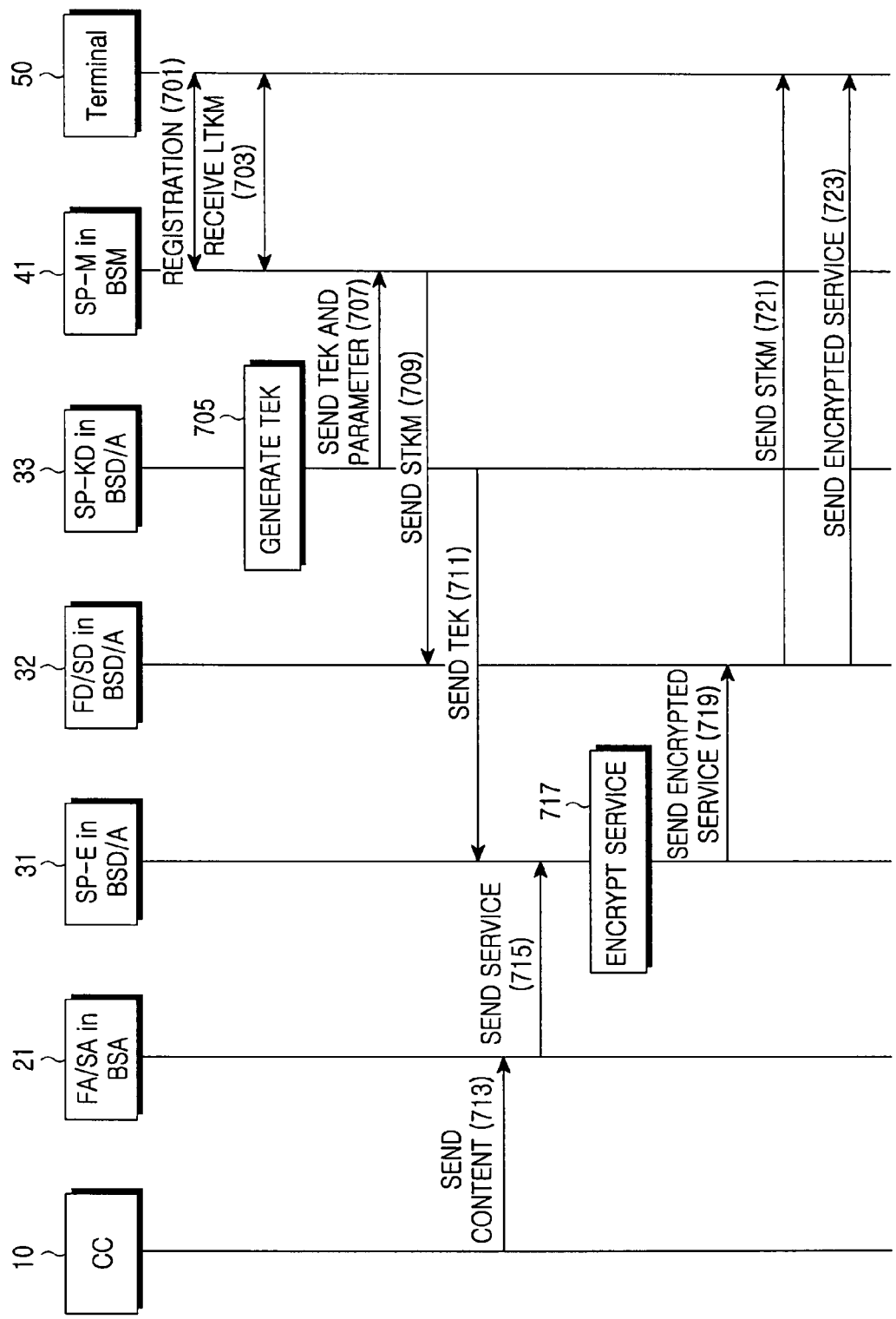
FIG. 7 illustrates a process performed during operation of a BCAST DRM profile in the broadcast service protection architecture presented in FIGS. 2 and 3.

FIG. 7 illustrates a process performed during operation of a BCAST Digital Radio Mondiale™ (DRM™) profile in the broadcast service protection architecture presented in FIGS. 2 and 3.

The DRM™ profile is a broadcast DRM™ standard made for the broadcast environment in which the DRM™ v2.0 standard defined in the OMA working group can be used.

Referring to FIG. 7, in step 701, a Terminal 50 accesses, via an Interaction Network 70, an Service Protection-Management (SP-M) component 41 in a BSM 40 that manages subscription information of a subscriber for receipt of a BCAST service, and performs a registration procedure for subscription to and reception of the BCAST service. The registration procedure has been described above.

After performing the registration procedure, the Terminal 50 acquires in step 703 an LTKM including therein SEK/SAK or PEK/PAK, from a Content Protection-Management (CP-M) component 42 in the BSM 40. Herein, the SEK/SAK are keys used for encryption/digital signature for a service, and the PEK/PAK are keys used for encryption/digital signature for a program. The service can be considered as a set of contents, and the program can be considered as one content.

An Service Protection-Key Distribution (SP-KD) component 33 in a BSD/A 30 generates in step 705 a TEK used when the Terminal 50 deciphers an encrypted service. Thereafter, the SP-KD component 33 in the BSD/A 30 sends in step 707 the generated TEK along with other parameters necessary for STKM generation (e.g. encryption method, information related to the encryption method, protocol version and time information), to the SP-M component 41 in the BSM 40.

Thereafter, upon receipt of the TEK and several parameters necessary for STKM generation, the SP-M component 41 in the BSM 40 encrypts the TEK with its own SEK and PEK, and performs digital signature processing on the STKM created with the other parameters including the encrypted TEK using the SAK and the PAK, thereby generating a completed STKM. Herein, a public/private key scheme as RSA, or MAC function processing can be used as the digital signature processing. The BSD/A 30 and the BSM 40 can exchange an STKM Delivery Message or an STKM Request Message, for an exchange of the TEK and several parameters necessary for STKM generation. A description of this process has been made above. In step 709, the SP-M component 41 in the BSM 40 delivers the STKM completed through the above process, to an File Distribution/Stream Distribution (FD/SD) component 32 in the BSD/A 30.

In step 711, the SP-KD component 33 in the BSD/A 30 sends the generated TEK to an Service Protection-Encryption (SP-E) component 31 in the BSD/A 30. The SP-E component 31 controls encrypting the received service, which corresponds to step 717 of FIG. 7.

A CC 10 delivers the content to an File Application/Stream Application (FA/SA) component 21 in a BSA 20. If the content is received, the FA/SA component 21 in the BSA 20 converts in step 715 the received content into a service and delivers it to the SP-E component 31 in the BSD/A 30. In step 717, the SP-E component 31 in the BSD/A 30 performs the foregoing encryption, and then delivers in step 719 the encrypted service to the FD/SD component 32 in the BSD/A 30.

In step 721, the FD/SD component 32 sends the completed STKM to the Terminal 50, and then in step 723, delivers the encrypted service up to the Terminal 50. In this manner, it is possible to provide the encrypted service to the terminal.

Figure 8:
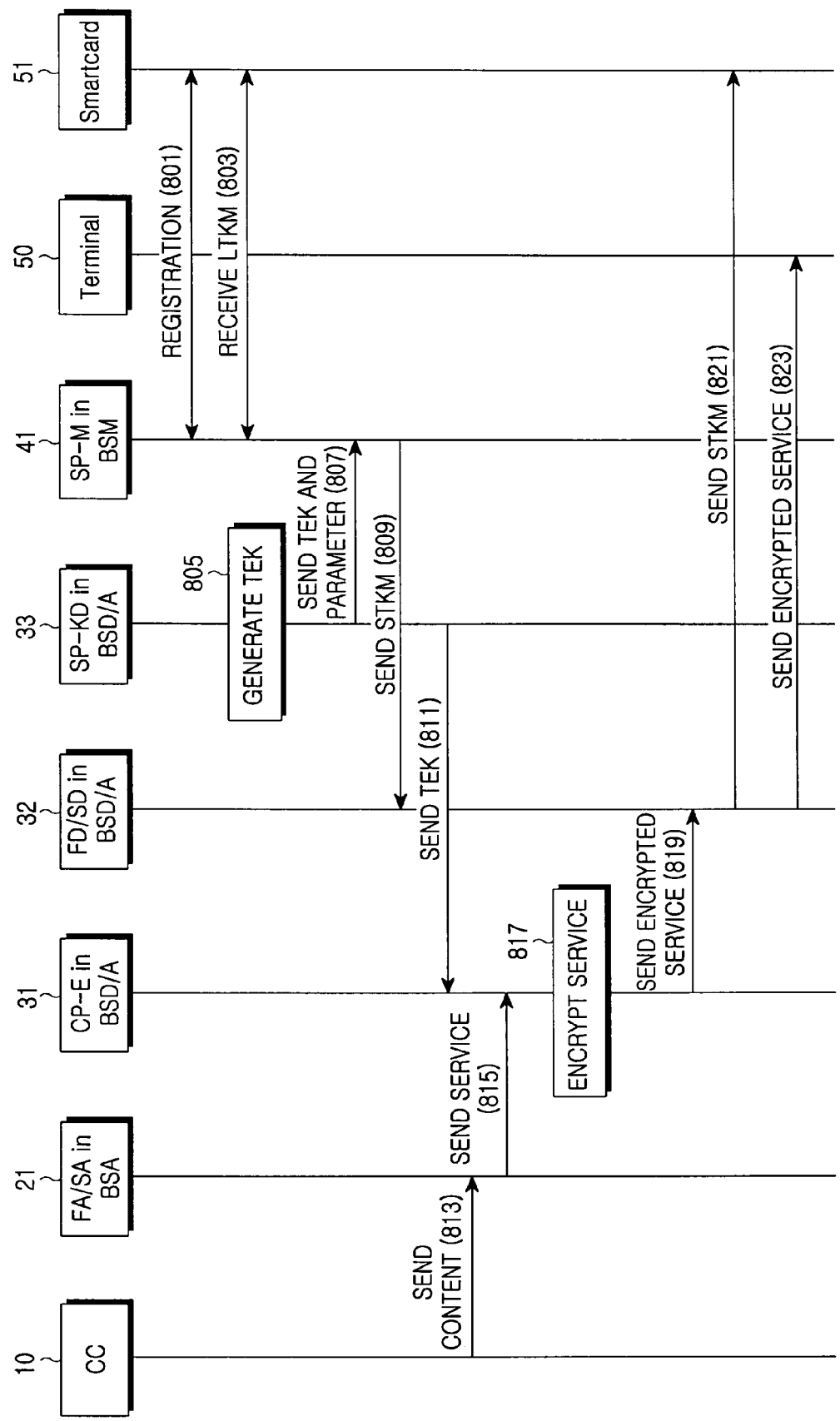
FIG. 8 illustrates a process performed during operation of a BCAST smartcard profile in the broadcast service protection architecture presented in FIGS. 2 and 3.

FIG. 8 illustrates a process performed during operation of a BCAST smartcard profile in the broadcast service protection architecture presented in FIGS. 2 and 3.

The process of FIG. 8 is almost similar to the process of FIG. 7. Therefore, references will be made to their associated processes, and only the different processes will be described below.

A registration process in step 801 is the same as the process of FIG. 7. In step 803, an entity for receiving an LTKM is a smartcard 51 included in a Terminal 50, unlike that in FIG. 7. The other steps 805 to 819 are to the same as steps 705 to 719 described in FIG. 7. Because the entity for receiving the LTKM is the smartcard 51 in the Terminal 50 as described above, an STKM is delivered in step 821 to the smartcard 51 in the Terminal 50 and a TEK is delivered to the Terminal 50 and then used for deciphering, in order to decipher the encrypted service. Thereafter, a process of transmitting the encrypted service in step 823 is to the same as the process of step 723. Therefore, the smartcard 51 included in the Terminal 50 can receive and process the encrypted service in the manner described in FIG. 8.

Figure 9:
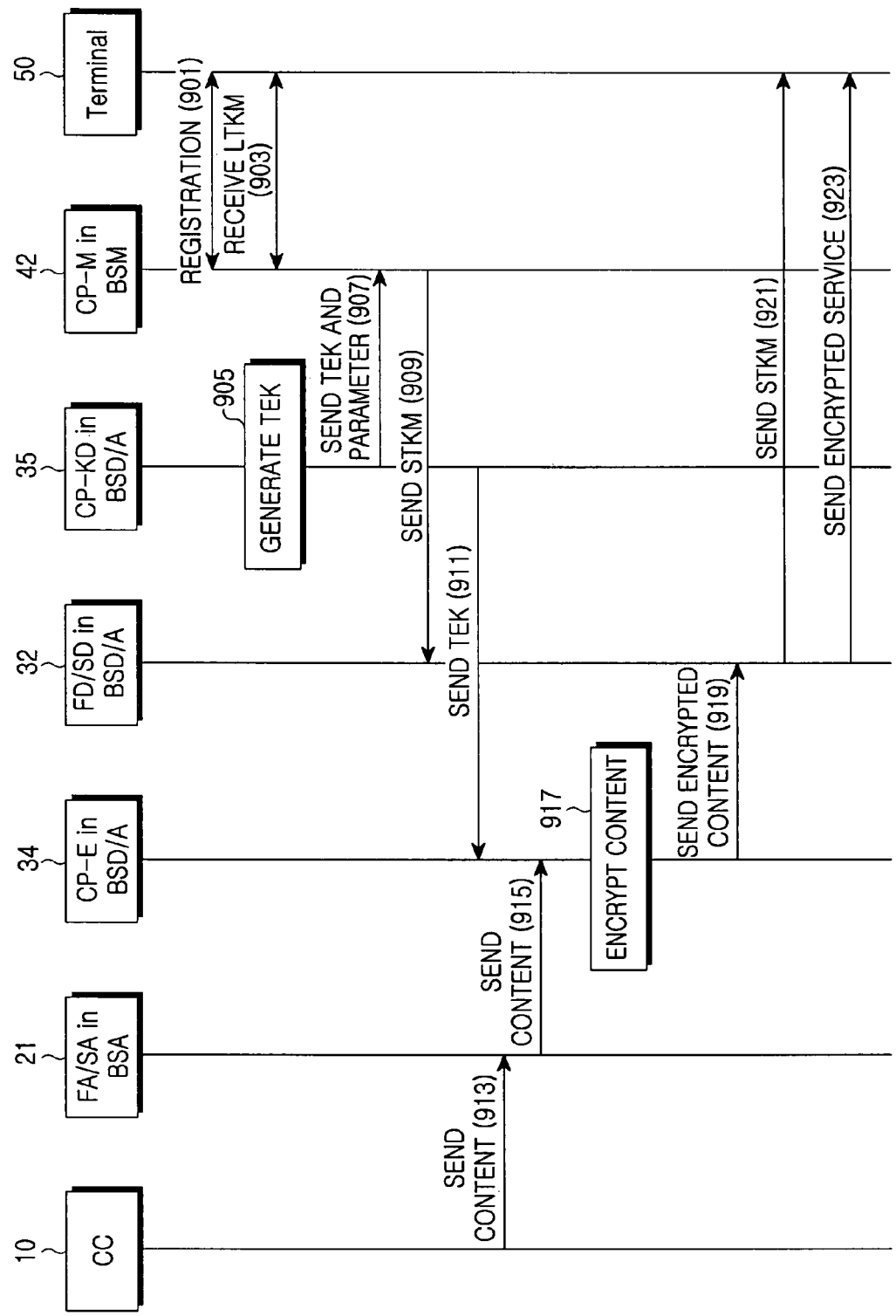
FIG. 9 illustrates a process performed during operation of a BCAST DRM profile in the broadcast content protection architecture presented in FIGS. 2 and 3.

FIG. 9 illustrates a process performed during operation of a BCAST DRM profile in the broadcast content protection architecture presented in FIGS. 2 and 3.

The process of FIG. 9 is also similar to the process of FIG. 7. FIG. 9 is different from FIG. 7 in that it operates based on the broadcast content protection architecture. Components in the content protection architecture are the same in function to components in the service protection architecture, but a CP-M component 42 in a BSM 40 can generate a Rights Object that can be used for performing right management. That is, in FIG. 9, unlike in FIG. 7, an SP-M component 41 in a BSM 40 is replaced with a CP-M component 42, and the CP-M component 42 can generate a Rights Object that can be used for performing right management.

Figure 10:
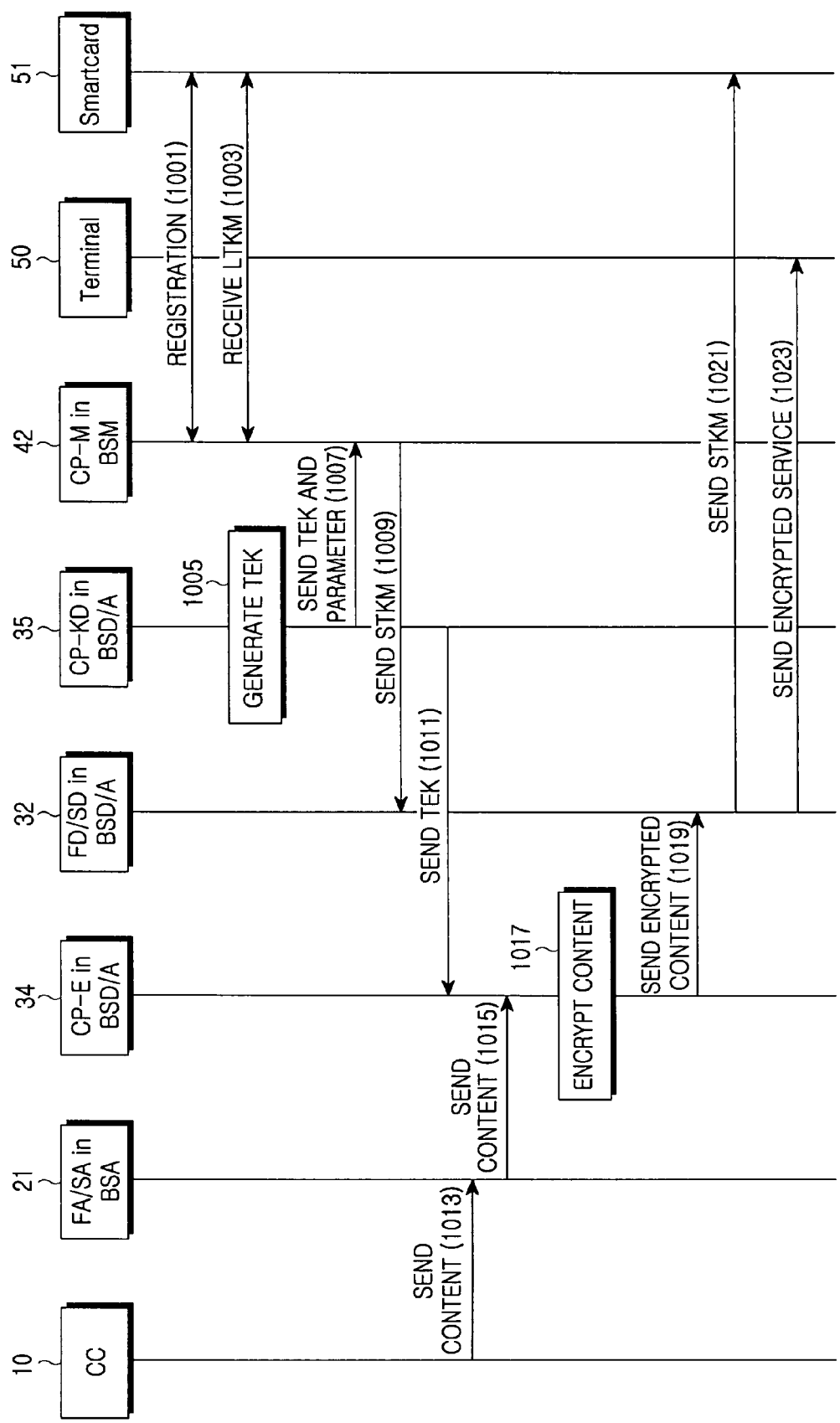
FIG. 10 illustrates a process performed during operation of a BCAST smartcard profile in the broadcast content protection architecture presented in FIGS. 2 and 3.

FIG. 10 illustrates a process performed during operation of a BCAST smartcard profile in the broadcast content protection architecture presented in FIGS. 2 and 3.

The process of FIG. 10 is similar to the process of FIG. 8 except that FIG. 10 operates based on the content protection architecture, like FIG. 9. Therefore, a difference between FIGS. 10 and 8 is to the same as the difference between FIGS. 7 and 9. That is, components in the content protection architecture are similar in function to components in the service protection architecture, but a CP-M component 42 in a BSM 40 can generate a Rights Object that can be used for performing right management. That is, in FIG. 10, unlike in FIG. 8, an SP-M component 41 in the BSM 40 is replaced with the CP-M component 42 which can generate a Rights Object that can be used for performing right management.

Figure 11:
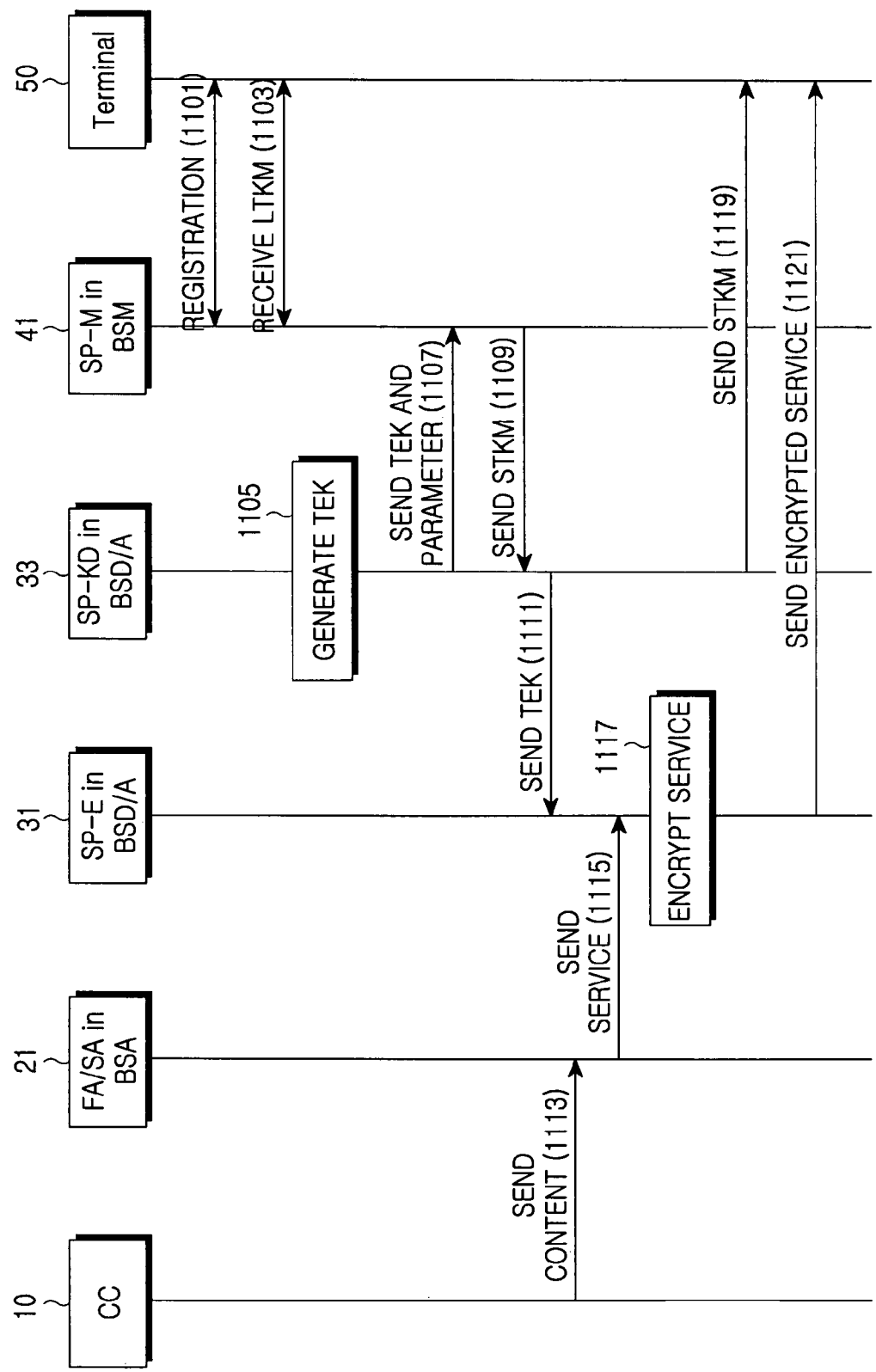
FIG. 11 illustrates a process in which the methods described in FIGS. 2 and 3 interwork with an STKM generation method in the broadcast service and content protection architecture.

FIG. 11 illustrates a process in which the methods described in FIGS. 2 and 3 interwork with broadcast service and content protection methods. Although an FD/SD component 32 in a BSD/A 30 is used in a process of transmitting an STKM in the embodiment of FIG. 7, the FD/SD component 32 is not used in the embodiment of FIG. 11.

Referring to FIG. 11, an operation in steps 1101 to 1107 is to the same as the operation performed in steps 701 to 707 of FIG. 7. In steps 1101 to 1107, a Terminal 50 performs a registration procedure for subscription to and reception of a BCAST service with an SP-M component 41 in a BSM 40, and performs an operation of receiving an LTKM including therein SEK/SAK or PEK/PAK from the SP-M component 41, and the SP-KD component 33 in the BSD/A 30 performs an operation of generating a TEK and then transmitting the generated TEK and other parameters necessary for STKM generation (e.g. encryption method, information related to the encryption method, protocol version and time information), to the SP-M component 41 in the BSM 40.

However, in the embodiment of FIG. 11, because the FD/SD component 32 is not used, the SP-M component 41 in the BSM 40 generates in step 1109 a completed STKM by performing digital signature processing on the STKM using the service/program authentication keys SAK/PAK, and transmits the generated STKM to the SP-KD component 33 in the BSD/A 30. Herein, a public/private key scheme as RSA, or MAC function processing can be used as the digital signature processing. Thereafter, in step 1111, the SP-KD component 33 in the BSD/A 30 transmits the TEK generated in step 1105 to the SP-E component 31 in the BSD/A 30. The SP-E component 31 controls encryption of the received service.

An operation in steps 1113 to 1117 is the same as the operation in steps 713 to 717 of FIG. 7. In steps 1113 to 1117, a CC 10 delivers content to an FA/SA component 21 in a BSA 20, the FA/SA component 21 converts the received content into a service and delivers the service to the SP-E component 31 in the BSD/A 30, and the SP-E component 31 encrypts the service. If the service encryption is completed in this manner, the SP-KD component 33 in the BSD/A 30 sends in step 1119 an STKM including the TEK used for deciphering the encrypted service/content, received from the SP-M component 41 in step 1109, to the Terminal 50.

Thereafter, in step 1121, the SP-E component 31 in the BSD/A 30 delivers the encrypted service to the Terminal 50 which deciphers the encrypted service using the STKM received in step 1119. Although the Terminal 50 receives the encrypted service in the embodiment of FIG. 11, it can also receive encrypted content.

Figure 12:
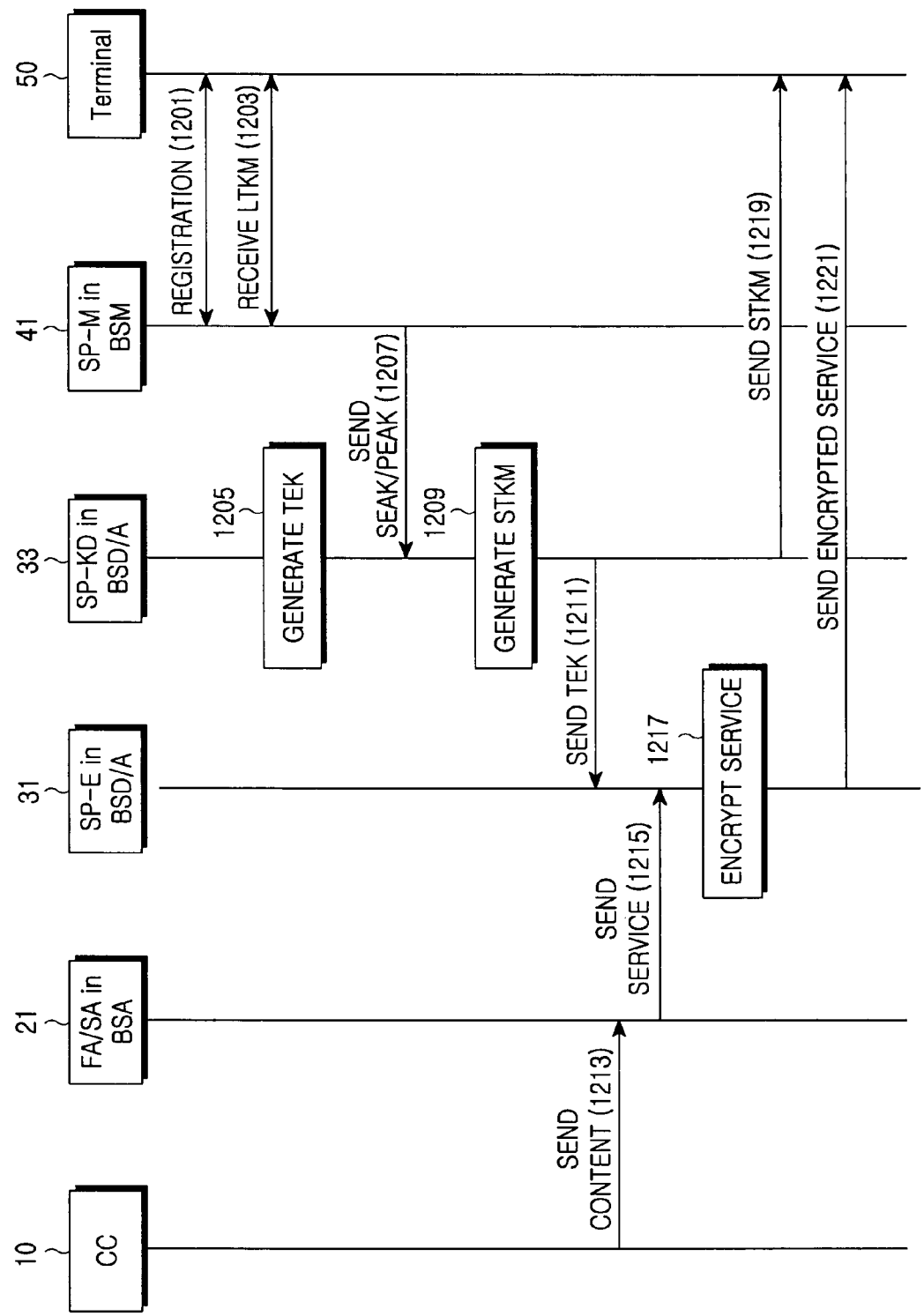
FIG. 12 illustrates a process in which the method described in FIG. 4 interworks with broadcast service and content protection architecture.

FIG. 12 illustrates a process in which the method described in FIG. 4 interworks with broadcast service and content protection methods. An embodiment of FIG. 12 is to the same as the embodiment of FIG. 11 except for the process of generating an STKM.

That is, in the process of generating the STKM, an SP-M component 41 in a BSM 40 sends in step 1207 an SEAK including therein SEK and SAK as keys used for encryption/digital signature for a service and/or a PEAK including therein PEK and PAK as keys used for encryption/digital signature for a program, to an SP-KD component 33 in a BSD/A 30. In step 1209, the SP-KD component 33 generates a completed STKM by performing digital signature processing thereon using service/program authentication keys SAK/PAK, and delivers in step 1219 the generated STKM to the Terminal 50. In addition, operations in steps 1201 to 1205 and steps 1211 to 1221 are to the same as the operations in steps 1101 to 1105 and steps 1111 to 1121 of FIG. 11, so a detailed description thereof will be omitted.

Although operations of the components in the service protection architecture have been described in the embodiments of FIGS. 11 and 12, operations of components in the content protection architecture can also be performed in the same manner. A difference between the embodiments of FIGS. 11 and 12 and the embodiments of FIGS. 9 and 10 for content protection is that the embodiments of FIGS. 11 and 12 do not use the FD/SD component 32 in the BSD/A 30. In addition, when the smartcard is used in the embodiments of FIGS. 11 and 12, the process of performing service registration on the Terminal 50 and receiving an LTKM can be achieved between the smartcard 51 and the SP-M component 41 or the CP-M component 42, and the STKM can be delivered to the smartcard 51 where the TEK can be acquired from the received STKM. In addition, the STKM delivery methods presented in FIGS. 2 and 3 can also be applied to the embodiments of FIGS. 11 and 12.

As can be understood from the foregoing description, the present invention provides a detailed TEK/STKM generation method and a detailed BCAST service protection method for transmitting/receiving encrypted service, between network entities in a mobile broadcast system, thereby enabling safe delivery of the broadcast service/content.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a Short Term Key Message (STKM) for protection of a broadcast service being broadcasted to a terminal in a broadcast system, the method comprising:
generating, by a Broadcast Service Distribution/Adaptation (BSD/A) which is responsible for transmitting the broadcast service to the terminal, a partially created STKM including a Traffic Encryption Key (TEK) before Message Authentication Code (MAC) processing, and transmitting the partially created STKM including the TEK to a Broadcast Service Subscription Management (BSM) which is responsible for managing subscription information;
encrypting, by the BSM, the TEK for deciphering of the broadcast service using a Service Encryption Key (SEK) or a Program Encryption Key (PEK); and
performing, by the BSM, MAC processing on the partially created STKM including the encrypted TEK, thereby generating a completed STKM.

2. The method of claim 1, wherein the broadcast service includes at least one content being provided to the terminal.

3. The method of claim 2, wherein a plurality of the STKMs are generated for one content.

4. The method of claim 1, wherein the performing of MAC processing further comprises:
performing, by the BSM, digital signature processing on the partially created STKM including the encrypted TEK using an authentication key.

5. The method of claim 1, further comprising:
sending, by the BSM, a request for transmission of the partially created STKM to the BSD/A prior to the transmitting step.

6. The method of claim 1, further comprising:
generating, by the BSM, the completed STKM and transmitting the completed STKM to the BSD/A.

7. The method of claim 1, wherein a plurality of the STKMs are generated for one broadcast service.

8. A broadcast system for transmitting a Short Term Key Message (STKM) for reception of a broadcast service to a terminal, the system comprising:
a Broadcast Service Distribution/Adaptation (BSD/A) for generating a partially created STKM including a Traffic Encryption Key (TEK) before Message Authentication Code (MAC) processing, transmitting the partially created STKM including the TEK to a Broadcast Service Subscription Management (BSM), encrypting the broadcast service using the TEK, and broadcasting the encrypted broadcast service; and
the BSM for managing subscription information of the terminal, encrypting the TEK received from the BSD/A using a Service Encryption Key (SEK) or a Program Encryption Key (PEK), generating a completed STKM by performing MAC processing on the partially created STKM including the encrypted TEK, and transmitting the completed STKM to the BSD/A,
wherein the BSD/A and the BSM are comprised of one or more servers in the broadcast system.

9. The broadcast system of claim 8, wherein the broadcast service includes at least one content being provided to the terminal.

10. The broadcast system of claim 9, wherein a plurality of the STKMs are generated for one content.

11. The broadcast system of claim 8, wherein the BSM performs digital signature processing on the partially created STKM including the encrypted TEK using an authentication key.

12. The broadcast system of claim 8, wherein the BSM sends a request for transmission of the partially created STKM to the BSD/A.

13. The broadcast system of claim 8, wherein the BSM generates the completed STKM and transmits the completed STKM to the BSD/A.

14. The broadcast system of claim 8, wherein a plurality of the STKMs are generated for one broadcast service.

* * * * *